United States Patent

[11] 3,610,869

| [72] | Inventors | Teiji Ito;<br>Takeshi Nishi; Arinobu Yamada;<br>Kunimasa Jono; Hikaru Aihara; Takashi<br>Maeba; Nobuji Kawae, all of Kitakyushu,<br>Japan |
|---|---|---|
| [21] | Appl. No. | 792,316 |
| [22] | Filed | Jan. 21, 1969 |
| [45] | Patented | Oct. 5, 1971 |
| [73] | Assignee | Nippon Steel Corporation<br>Tokyo, Japan |
| [32] | Priority | Jan. 20, 1968 |
| [33] | | Japan |
| [31] | | 43/3596 |

[54] HIGH FREQUENCY CURRENT RESISTANCE WELDING METHOD FOR MAKING SHAPED PRODUCTS
2 Claims, 17 Drawing Figs.

[52] U.S. Cl. .................................................. 219/107, 219/67
[51] Int. Cl. ........................................................ B23k 13/00
[50] Field of Search ............................................. 219/67, 102, 103, 107, 9.5

[56] References Cited
UNITED STATES PATENTS

| 3,513,284 | 5/1970 | Snyder ......................... | 219/107 X |
| 2,774,857 | 12/1956 | Rudd et al. ................... | 219/67 |
| 2,821,619 | 1/1958 | Rudd ............................ | 219/107 |
| 3,410,982 | 12/1968 | Morris et al. ................. | 219/102 |

*Primary Examiner*—J. V. Truhe
*Assistant Examiner*—Hugh D. Jaeger
*Attorney*—Wenderoth, Lind & Ponack ABSTRACT: In the high frequency current resistance welding of the materials requiring different heat capacities, a method for pressure welding of the materials after preheating the material requiring more heat at a position before the welding point to a temperature between 250° and 1,050° C. in an area more than one-third wider than the thickness of the material requiring less heat.

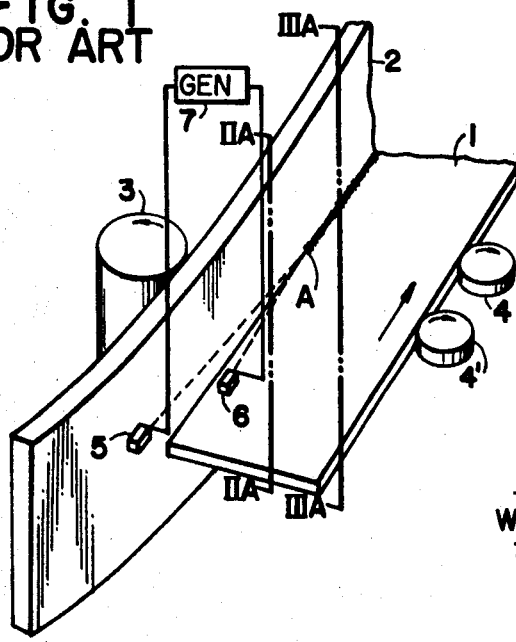
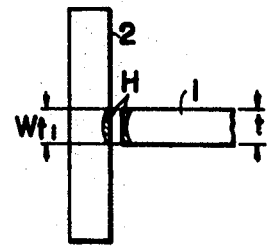
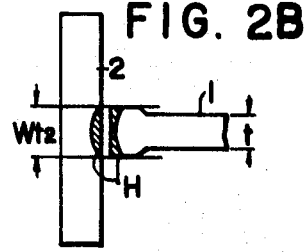
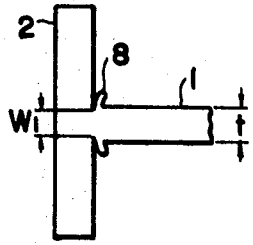
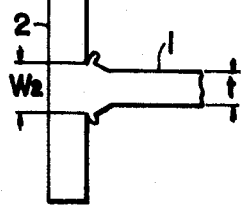
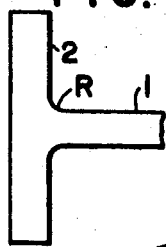
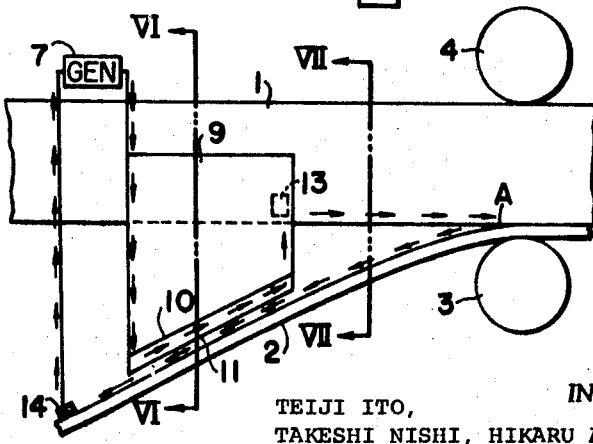

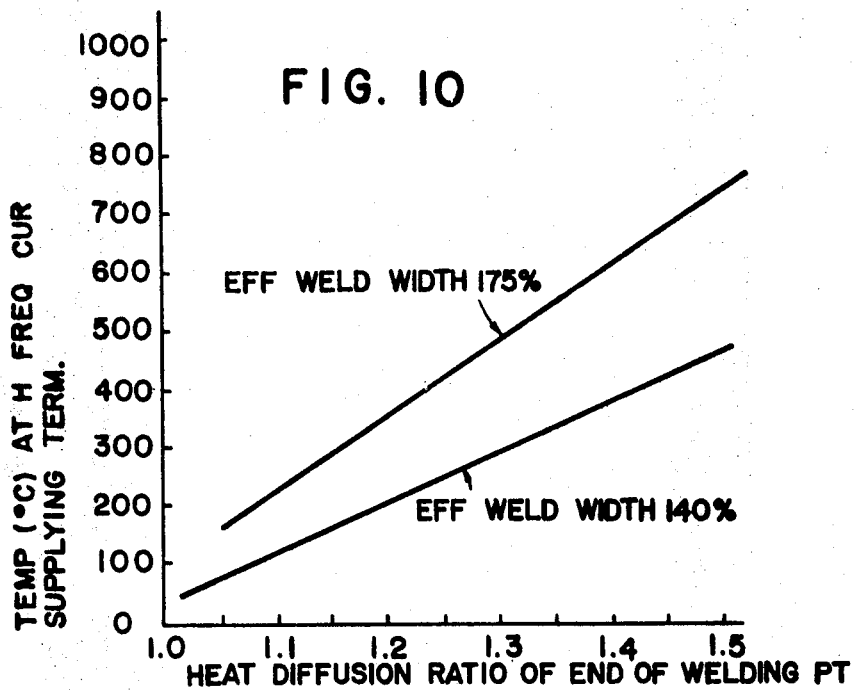
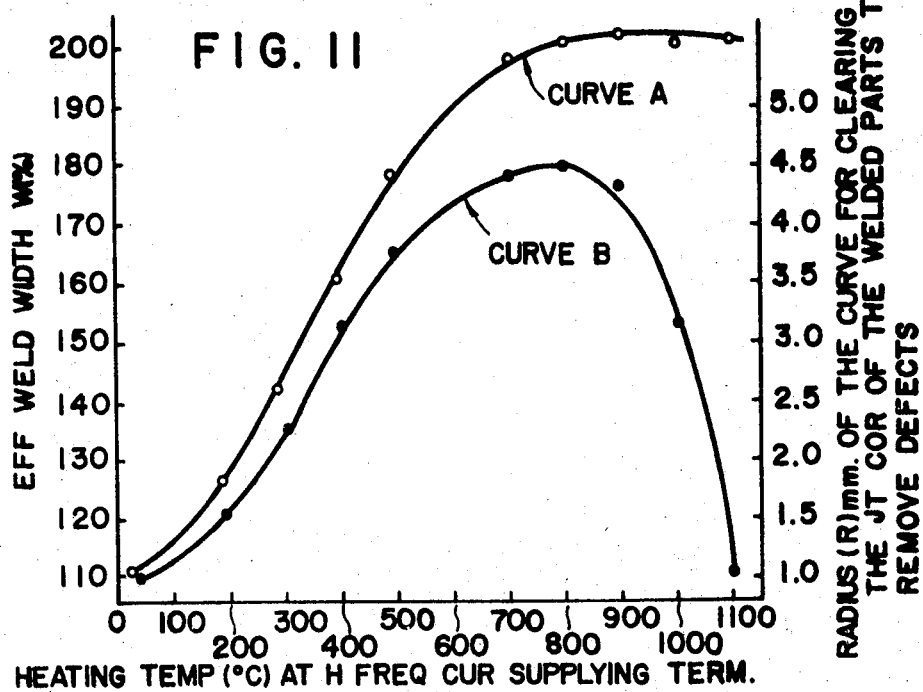

3,610,869

HIGH FREQUENCY CURRENT RESISTANCE WELDING METHOD FOR MAKING SHAPED PRODUCTS

BACKGROUND OF THE INVENTION

1. Field of the Invention

The present invention relates, in general, to a high-frequency current resistance welding method for making shaped products, and more particularly to an improved high-frequency current-welding method for continuously welding two or more metal objects respectively having different shapes and sizes of the ends at their respective weld by heating with a directly introduced high-frequency current so as to make products of T-section.

2. Description of the Prior Art

As is widely known, the high frequency current resistance welding method heretofore in general use is so effected that a high-frequency current of about 450 kc. is introduced directly to the vicinity of the welding area of the to-be-welded objects, and the resistance heat so generated is used as the heat source for pressure welding.

However, when producing T-shaped or H-shaped steel products by this conventional high-frequency current resistance welding method, the effective weld widths of the materials to be welded into the web and the flange vary according to such welding conditions as the volume of high-frequency current supplied, the moving speed of the materials, the up-set form of the welding parts of the material to the welded into the web, and squeeze volumes given to the materials. Even the optimum combination of these conditions brings about an effective weld width of only about 100 percent of the thickness of the material to be welded into the web, and it is difficult to raise the percentage by the above mentioned conventional method.

This is due to the difference between the two materials in their shapes and sizes of their ends to be welded, and therefore, in their heat capacity (or heat diffusion), that is, because the heat diffusion of the heated part of the materials to be welded into the flange is greater than that of the other material.

Thus, it is thought to be very difficult to produce shaped products having an effective weld width of more than 110 percent of the thickness of the web material by welding two metal objects requiring different heat capacities continuously by the conventional high-frequency current resistance welding method.

SUMMARY OF THE INVENTION

The present invention is the embodiment of an absolutely new idea brought up as a result of studies of the above-mentioned phenomena. In welding the materials requiring different hear capacities according to the present invention, only the end of the material requiring more heat capacity when welding is preheated at a position before the pressure welding point, so as to maintain its temperature at the pressure welding point adequate for high-frequency current welding, thereby making possible the continuous welding of the materials at the pressure welding point, with an enlarged weld width. Taking the production of a T-shaped steel product for example, the purpose of the present invention is to obtain such merits as an effective weld width of about 200 percent enlarged from about 110 percent, which is the maximum obtained by the conventional high-frequency current resistance welding method, and improvements in fatigue strength, the clearing of the joint corner of the welded parts, as well as static mechanical properties, and prevention the occurrence of deformation of the web material by compression in the direction of the width of the material to be welded into the web.

In order to attain the above-mentioned purpose, the present invention has been worked out as a high-frequency current welding method so improved that in the high-frequency current welding of the materials requiring different heat capacities into T-shaped or H-shaped products, the surface of the material requiring more heat is preheated in a range of more than one third greater than the thickness of the to-be-welded material requiring less heat to a temperature between 250°and 1,050° C. by another source than or the same source as that for welding

BRIEF DESCRIPTION OF THE DRAWINGS

FIG. 1 presents an example of the production of a T-shaped product by the conventional high-frequency current-welding method;

FIG. 2A and Fig. 2B respectively show the cross sections of the materials of FIG. 1 along II—II line and of another set of materials;

FIG. 3A and FIG. 3B respectively show the cross sections of the weld widths of the materials of FIG. 1 along III—III line and of the weld widths of another set of materials;

FIG. 4 shows the cross section of the joint corner of the welded parts after being cleared;

FIG. 5 presents an example of high-frequency current welding according to the present invention;

Figure 12:
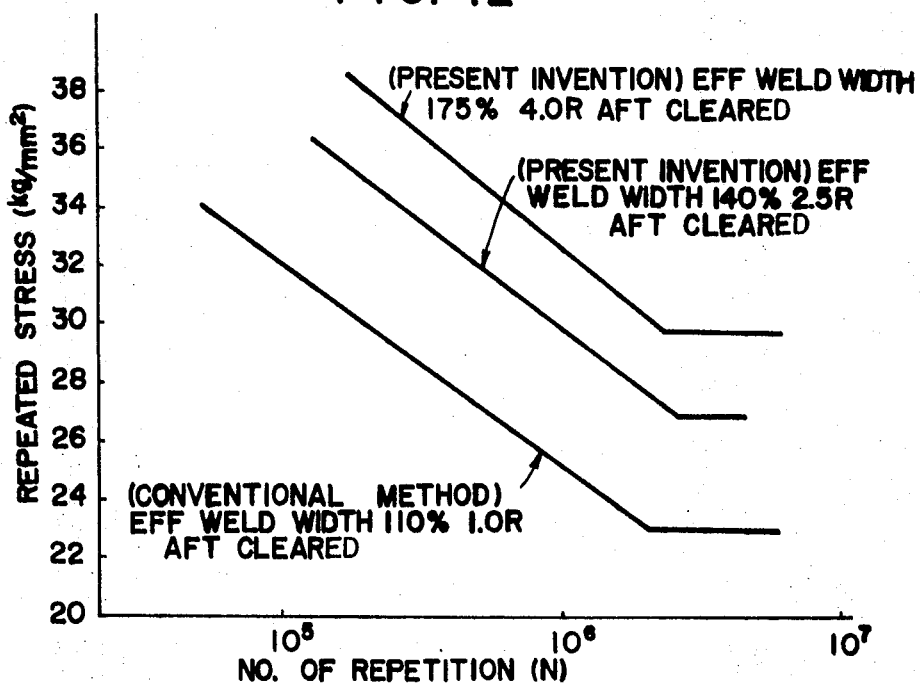
Figure 13A:
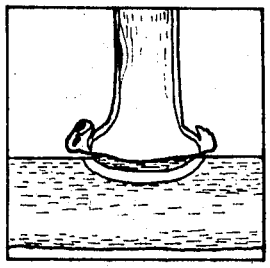
Figure 13B:
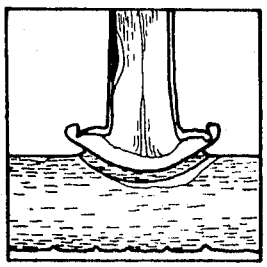
Figure 13C:
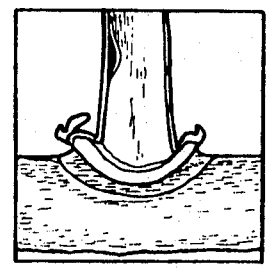

FIG, 10 shows the relationship between heating temperatures and heat diffusion ratios for the production of weld widths according to the present invention;

FIG. 11 shows the relationship among heating temperatures, weld widths and radius R of the curve for clearing the joint corner of the welded parts to remove defects;

FIG. 12 shows the relationship between factors of the fatigue tests in example 1 of the present invention;

FIG. 13A, B and C are schematic drawings of photographs of the macrostructure of the welded parts of the materials obtained in example 2 of the present invention.

DESCRIPTION OF THE PREFERRED EMBODIMENT

Using the preferred example, the present invention is compared with the high-frequency current-welding method heretofore in use, as follows:

FIG. 1 presents a brief description of the conventional method, using an example of the production of a T-shaped steel product.

In the figure, the material to be welded into the web (hereafter referred to as the web material) 1 and the material to be welded into the flange (hereafter referred to as the flange material) 2 from a V-shaped opening with the pressure welding point A as the apex and the legs extending toward the high-frequency current-supplying terminals 5 and 6. High-frequency current is generated by the high-frequency current generator 7 and introduced through the terminals 5 and 6 to the pressure welding point A, the current circuit from the terminals to the point A being shown by dotted lines. The current converges at the point A to generate heat for local heating of the materials. As they are conveyed in the direction of an arrow mark, the web material 1 and the flange material 2 are heated to the welding temperature at the point A and subjected to pressure welding appropriately by the squeeze rolls 3, 4 and 4'.

The so welded parts of the materials are shown in FIG. 2A and B (the cross section of FIG. 1 along line II—II. Fig. 2A illustrates the high-frequency current welding of materials in which the width wt. of the end of the web material, is the same as its thickness $t$ and the area of the heating of the flange material is the same width as the thickness of the web material, as shown by areas H.

By pressing the materials at the point A, the weld is obtained as shown in FIG. 3A (the cross section of FIG. 1 along line III—III). Even if welding is carried out at optimum conditions, the so obtained weld width is about 80 percent of the thickness of the web material $t$, no weld width of more than 100 percent $W_1$ being possible by changing welding conditions. In the other case shown in FIG. 2B where the end of the web material is increased to 1.4 times $t$, a weld width somewhat greater than, that is, about 110 percent as large as of the thickness $t$ of web material may be obtained. In this case, the area of heating of flange material 2 is the same width as the thickness wt. 2 of the increased web end because of the bordering effect of the high-frequency current. But the weld width $W_2$ is only about 1.1 times of the thickness $t$ of the web material 1 because heat diffusion is so great in the flange material.

The improvement of appearance and fatigue strength of the joint of the welded parts will be obtained by clearing beads 8 at the joint corner, as shown in FIG. 4. If the weld width W is small, the radius R of the curve for clearing the joint corner becomes small, therefore, the so cleared joint corner has only a short foot. For example, if the weld width is about 110 percent of $t$, the radius of the clearing curve is only 1 mm. meaning that the smaller the weld width W the poorer the mechanical properties of the product. Therefore, it is desirable that the weld width be made greater.

According to the above-mentioned conventional high-frequency current resistance welding method, in welding materials having differently shaped ends, the difference in heat capacities required for welding such differently shaped ends, considerably influences the quality of the welds, which are generally unsatisfactory, compared with those which are obtained by welding materials requiring nearly the same heat capacities.

Such difficulty of the conventional method is solved by the present invention in that in the continuous welding of materials requiring different heat capacities continuously, the welding surface of the material having the greater heat diffusion is preheated at a position before the pressure welding point, preferably in the vicinity of the terminal for supplying current for welding, an area wider than the thickness of the material having the smaller heat diffusion to a temperature between 250° and 1,050° C. by the welding heat source or a separate heat source. Then both materials are heated with high-frequency current supplied through the terminals supplying current for welding in the vicinity of the pressure welding point. Then the heated areas of the materials are pressed together by squeeze rolls into a product, thereby making possible the enlargement of the weld width and the prevention of deformation of the web material by the compression in the direction of the width from occuring during pressing. The cooling speed of the so welded product is generally slower than that of the part subjected to local heating by the conventional high-frequency current resistance welding method, thereby making it possible to carry out the clearing of the joint corner of the welded parts while hot, which results in a great improvement of processability and other properties of the so welded product.

Figure 6:
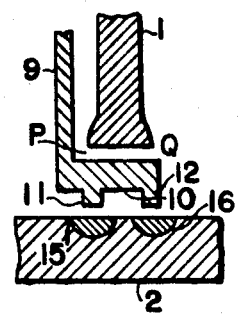
FIG. 6 and FIG. 7 respectively show the cross sections of the heated parts of the materials shown in FIG. 5 along VI—VI line and VII—VII line.
Figure 7:
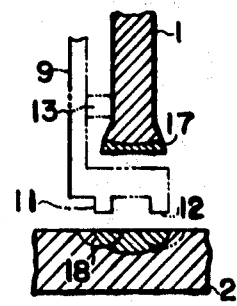

An example of the preheating according to the present invention is shown in FIG. 5, in which 1 indicates the web material, 2 the flange material, 3 and 4 the squeeze rolls, and 7 the source of high-frequency current, 9 indicates an electrode positioned to slide on the web material, which electrode has the end 10 having the projections 11 and 12 thereon in parallel with the welding surface of the flange material 2 at a particular angle to the web material 1. It is desirable to provide the projections 11 and 12 on the lines extended respectively from the edges P and Q of the end of the web material 1, as shown in FIG. 6. Electrode 9 is connected to the web material 1 through the terminal 13 consisting of a connecter taking the form of either a roll or brush contacting the web material 1, at an appropriate point before the pressure welding point. High-frequency current is introduced from the electric source 7 through the inside surface of the materials due to the bordering effect, as shown by the arrows in FIG. 5 to a further terminal 14 consisting of an electrode, thereby inducing an overcurrent between the electrode 9 and the flange material 2. This current heats only the parts 15 and 16 of the flange material 2 opposite to the projections 11 and 12 in the vicinity of the cross section of the flange material 2 along VI—VI line, as shown in FIG. 6. Furthermore, in the vicinity of the cross section along VII—VII line, as shown in FIG. 7, the end 17 of the web material 1 is heated with high-frequency-welding current and at the same time, the part 18 of the flange material 2 opposite the end 17 is heated. The width of heated area 18 equals the width of end 17. Then web material 1 and flange material 2 are pressed at the pressure welding point A by the squeeze rolls 3 and 4, so that an enlarged weld width is obtained.

Figure 8:
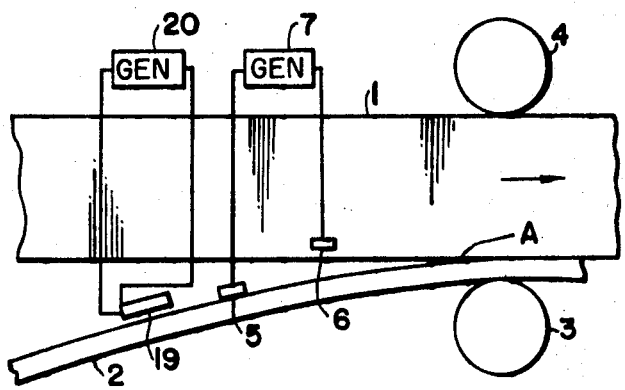
FIG. 8 presents another example of high-frequency current welding according to the present invention.

The following is the description of another example of the present invention characterized by preheating, as shown in FIG. 8. 1 indicates the web material, and 2 the flange material, these to join at the pressure welding point A, 5 and 6 the terminals for supplying high-frequency current and 7 the high-frequency current generator to supply current through said terminals 5 and 6 for heating the material to the desired temperature. 19 indicates the high-frequency current induction coil supplied by another high-frequency current generator 20 to preheat the area of the flange material 2 to be welded. For this purpose could also be used a gas heating apparatus. As mentioned above, the gist of the present invention lies in the preheating of the welding surface of the flange material requiring greater heat to an appropriate temperature.

Figure 9:
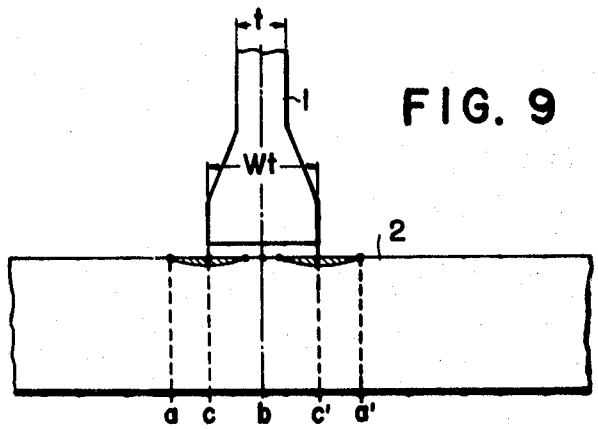
FIG. 9 shows the heating area of the high-frequency current supplying terminal according to the present invention.

However, if the reheating temperature generated through the electrode 9 in FIG. 5 or the induction coil 19 in FIG. 9 in the vicinity of the terminals for supplying current for welding or at a position before the pressure welding point A is too high, the end of the web material 1 is pressed too deeply into the flange material 2, making it impossible to obtain a satisfactorily large radius of the curve for clearing the joint corner of the welded parts, which results in degradation of strength of the product. FIG. 9 shows an appropriate heating range in the vicinity of the terminals for supplying high-frequency current for welding or at a position before the pressure welding point A according to the present invention.

It is necessary that the distance between the two points $a$ and $a'$ on the welding surface of the flange material 2 opposite to the web material 2 should be respectively more than one third greater than the distance between the points $c$ and $c'$ which is the reflection on the flange material 2 of the thickness wt. of the end of the web material 1, and that the temperature generated in the areas between $a$ and $c$ and between $a'$ and $c'$ should be between 250° and 1,050° C. which meets the desired temperature at the point $b$ situated in the center of the reflection of the thickness of the web material of 1, from room temperature to 1,050° C.

FIG. 10 shows a change in the temperature required at the current supplying terminal for obtaining effective weld widths of 140 and 175 percent by welding the increased thickness end of the web material 1 as exemplified in FIG. 9. For example, assume the thickness $t$ of the web material 1 is 5.5 mm. the increased wt. of the end 7.0 mm., the thickness $t'$ of the flange material 2 is 8 mm., and the heat diffusion ratio on the welding surface is 1.28 (though the ratio of heat diffusion between the materials in practice, the heat diffusion ratio is based on the thicknesses of materials themselves, that is, in case of a T-shaped product, the ratio of the average of the thickness $t$ of the web material and the thickness wt. of the increased end thereof, namely, $(t+\text{wt.})/2$, against the thickness $t'$ of the flange material, represents the heat diffusion ratio of the two materials) then FIG. 10 shows that if the heating temperature is above 250° C., an effective weld width of more than 140 percent of $t$ can be obtained compared with an effective weld width $W_2$ of 110 percent of $t$ produced by the conventional method as shown in FIG. 3B.

FIG. 11 shows the relationship between heating temperatures of the flange material 2 and effective weld widths and between such temperatures and radiuses of the curves for clearing the joint corners.

One hundred ten percent is the maximum effective weld width obtainable by the conventional high-frequency current-welding method, but, according to the present invention, the effective weld width W can be enlarged sharply as shown with line A in the figure, by preheating to an appropriate temperature, such enlargement being saturated at 200 percent at about 800° C.

As mentioned above, the enlargement of the effective weld width influences the strength of the joint of the welded parts, deformation of the web material by the compression in the direction of the width and the clearing of the joint corner of the welded parts. Regarding the radius of the curve for clearing the joint corner leaving no defects, it starts to degrade sharply at the above-mentioned point as shown with line B of FIG. 11.

Therefore, even when using the method of the present invention, if the temperature for preheating at a position before the pressure welding point A or in the vicinity of the current supplying terminal is too high, resistance heat generated in the welding part, in addition to the heat for preheating, allows the end of the welding part of the web material 1 to sink too deeply into the flange material 2, making it impossible to obtain a satisfactorily large radius of the curve for clearing the joint corner.

Furthermore, when the effective weld width is enlarged by using the method of the present invention, the strength of the joint of the welded parts is also greatly improved.

The following is the description of examples according to the present invention.

EXAMPLE 1

Fig. 12 shows the result of tests for fatigue strength, made parallel to the weld joint of a T-shaped product as exemplified in FIG. 8 produced by the method of to the present invention with the web material 1 having a thickness of 5.5 mm. and an increased thickness of the end of 7.0 mm. and the flange material 2 having a thickness of 8.0 mm., with a heat diffusion ratio between these materials of 1.28, under the welding conditions as mentioned in table 1.

It can be understood from FIG. 12 that the enlargement of the effective weld width and of the radius of the curve for clearing the joint corner, obtained by preheating according to the present invention, improves fatigue strength remarkably over the welded product having a smaller effective weld width produced by the conventional method. Also, the squeeze volume functions in enlarging the effective weld width; the more the former, the somewhat greater the latter tends to expand.

In an example of the present invention for the production of a T-shaped product by welding a web material having a thickness of 3.2 mm. and an increased thickness of the end of 4.0 mm. to a flange material having a thickness of 6.0 mm., no deformation of the web material by compression in the direction of the width occurred in the weld with a squeeze volume of 1.18 mm. after preheated at 200° C., nor even with a squeeze volume of 4.5 mm. after preheated 500° C., while deformation of the web material by the compression in the direction of the width occurred in a weld produced by the conventional method with a squeeze volume of 1.18 mm.

EXAMPLE 2

FIG. 3A, B and C are schematic drawings of photographs of the macrostructure of the welded parts of a T-shaped product produced by the method of the present invention with materials of the same source as example 1, under the welding conditions as mentioned in table 2.

It can be seen from the table that compared with the conventional high-frequency current resistance-welding method, the present invention which presents preheating of the welding surface of the material having greater heat diffusion, produces a much greater effective weld width.

The enlargement of the effective weld widths established in the above examples results in the improvement of various properties, including the strength of the joint.

The following are some merits of the weld produced according to the present invention.
1. Improve static, mechanical properties;
2. increase fatigue strength;
3. Prevent deformation of the web material by the compression in the direction of width during squeeze;
4. Raise efficiency in the clearing of the joint corner, obtaining a longer foot thereof; and
5. Raise the welding speed per capacity of the electric source for welding.

The high-frequency current resistance-welding method according to the present invention, of which the heating conditions and welding method are described in detail in the above examples greatly improves the quality of the welded part of the product, thereby widening the field of application of such product. Needless to say, the method of the present invention can be applied to high-frequency current resistance welding for the continuous production of products of various shapes.

What is claimed is:

1. In the pressure welding of a web material to a flange material by high-frequency current resistance method to produce a T-shaped product or similarly shaped products, the improvement comprising placing between said flange and web materials an electrode having two projections aligned with both edges of the end of said web material and directed toward the surface of the flange material, and preheating the surface portions of said flange material which are opposite to said projections of said electrode over a width more than one-third of the width of said end of the web material to temperature between 250° C. and 1,050° C.

2. In the pressure welding of a web material to a flange material by the high-frequency current-resistance method to produce a T-shaped product or similarly shaped products, the improvement comprising preheating said flange material over an area more then one-third wider than the width of the end to be welded of said web material to a temperature of between 250° C. to 1,050° C., said preheating being accomplished by a heat source separate from the welding heat source and comprising a high-frequency generator with an induction coil positioned in the vicinity of said flange material.

TABLE 1

| Welding method | Preheating temp. (° C.) | Web thick. (mm.)/flange thick. (mm.) | Welding speed (f.p.m.) | High freq. plate current (a.) | Squeeze volume (mm.) | Effective welding width (percent) | Radius of the curve for clearing the joint corner of the welded parts (mm.) |
|---|---|---|---|---|---|---|---|
| Conventional | None | 5. 5/8. 0 | 25 | 17. 5 | 2. 5 | 110 | 1. 0 |
| Present invention | 250 | 5. 5/8. 0 | 25 | 17. 5 | 2. 5 | 140 | 2. 5 |
| Do | 450 | 5. 5/8. 0 | 25 | 17. 5 | 2. 5 | 175 | 4. 0 |

TABLE 2

| Welding method | Web thick. (mm.)/flange thick. (mm.) | Heating temp. at terminal (° C.) | Welding speed (f.p.m.) | High freq. plate current (a.) | Squeeze volume (mm.) | Effective weld width (percent) |
|---|---|---|---|---|---|---|
| Conventional (A) | 5. 5/8. 0 | None | 25 | 17. 5 | 2. 5 | 109. 2 |
| Present invention (B) | 5. 5/8. 0 | 700 | 25 | 17. 5 | 2. 5 | 196. 9 |
| Present invention (C) | 5. 5/8. 0 | 1,100 | 25 | 17. 5 | 2. 5 | 200. 9 |